US011919657B2

(12) United States Patent
Kamat et al.

(10) Patent No.: US 11,919,657 B2
(45) Date of Patent: Mar. 5, 2024

(54) AIRCRAFT LANDING GEAR MONITORING AND ALERTING SYSTEM AND METHOD

(71) Applicant: The Boeing Company, Chicago, IL (US)

(72) Inventors: Ameya D. Kamat, Bangalore (IN); Tim W. Anstey, Everett, WA (US); Surya Sundar Raj Durairaj, Bangalore (IN)

(73) Assignee: The Boeing Company, Chicago, IL (US)

( * ) Notice: Subject to any disclaimer, the term of this patent is extended or adjusted under 35 U.S.C. 154(b) by 620 days.

(21) Appl. No.: 16/867,985

(22) Filed: May 6, 2020

(65) Prior Publication Data

US 2021/0347498 A1 Nov. 11, 2021

(51) Int. Cl.
*B64D 45/06* (2006.01)
*B64D 43/00* (2006.01)
*B64D 45/00* (2006.01)

(52) U.S. Cl.
CPC ............ *B64D 45/06* (2013.01); *B64D 43/00* (2013.01); *B64D 45/0005* (2013.01); *B64D 2045/0085* (2013.01)

(58) Field of Classification Search
CPC .... B64D 45/06; B64D 43/00; B64D 45/0005; B64D 2045/0085; B64C 25/28; B64C 25/26

See application file for complete search history.

(56) References Cited

U.S. PATENT DOCUMENTS

| 5,839,692 A * | 11/1998 | Ralph | B64C 25/12 244/102 R |
| 6,405,975 B1 * | 6/2002 | Sankrithi | B64D 47/08 244/50 |
| 8,256,703 B1 | 9/2012 | Jefferson et al. | |
| 2008/0036617 A1 * | 2/2008 | Arms | G01M 5/00 340/693.1 |

(Continued)

FOREIGN PATENT DOCUMENTS

| BR | PI1003411 A2 * | 9/2010 | |
| BR | PI1003411 A2 * | 1/2013 | B64C 25/20 |
| EP | 3805097 A1 * | 4/2021 | B64C 25/20 |

*Primary Examiner* — Donald J Wallace
*Assistant Examiner* — Jalal C Coduroglu
(74) *Attorney, Agent, or Firm* — Quinn IP Law (57) ABSTRACT

A landing gear monitoring and alerting system includes a locking pin configured to be inserted into an aperture extending through a linkage of an extended landing gear assembly. When inserted into the aperture, the locking pin inhibits movement of the linkage to establish a locked state of the extended landing gear assembly. This system further includes a magnetic sensor and a communication module. The magnetic sensor is disposed proximate the aperture and is configured to sense a magnetic response indicative of the locking pin being disposed within the aperture. The magnetic sensor is configured to generate a sensor output indicative of the locking pin being disposed within the aperture. The communication module has a transmitter coupled to the magnetic sensor so as to receive the sensor output and is configured to responsively transmit a signal indicative of the locking pin being disposed within the aperture.

20 Claims, 7 Drawing Sheets

(56) References Cited

U.S. PATENT DOCUMENTS

| | | | |
|---|---|---|---|
| 2008/0303726 A1* | 12/2008 | Pradier | B60C 23/0444 |
| | | | 343/705 |
| 2009/0127389 A1* | 5/2009 | Reynes | B64C 25/16 |
| | | | 244/102 A |
| 2009/0242696 A1* | 10/2009 | Wilby | B64C 25/26 |
| | | | 343/705 |
| 2010/0121504 A1* | 5/2010 | Jones | G07C 5/008 |
| | | | 701/16 |
| 2014/0375479 A1* | 12/2014 | Mazoyer | G08G 5/0052 |
| | | | 340/971 |
| 2015/0261379 A1* | 9/2015 | Kneuper | B64D 43/00 |
| | | | 345/173 |
| 2018/0232097 A1* | 8/2018 | Kneuper | G06F 3/0416 |
| 2018/0265215 A1 | 9/2018 | Pollard et al. | |
| 2018/0286258 A1 | 10/2018 | Derbanne | |
| 2019/0112036 A1* | 4/2019 | Persico | B64C 25/26 |
| 2020/0080609 A1* | 3/2020 | Muniraju | G01D 5/40 |
| 2021/0107632 A1* | 4/2021 | Kulkarni | B64C 25/20 |

* cited by examiner

AIRCRAFT LANDING GEAR MONITORING AND ALERTING SYSTEM AND METHOD

TECHNICAL FIELD

The present disclosure generally relates to aircraft, and more particularly, to an aircraft landing gear monitoring and alerting system and method.

BACKGROUND

Some aircraft include a landing gear. During landing, the landing gear of an aircraft comes in contact with a surface of an airport runway to facilitate a smooth landing. In addition, the landing gear is used during taxiing to facilitate movement of the aircraft on the airport runway.

SUMMARY

The present disclosure describes an aircraft landing gear monitoring and alerting system and method. The landing gear monitoring and alerting system alerts the flight crew and ground crew when a locking pin is disposed within an aperture of a linkage of an extended landing gear assembly. This locking pin inhibits movement of the linkage, thereby precluding the landing gear assembly from moving from the extended position to a retracted position. It is desirable to remove the locking pin from the aperture of the linkage before aircraft take-off to allow the landing gear assembly to retract. Failure to do so may increase the drag acting on the aircraft, thereby increasing the fuel consumed by the aircraft. As a consequence, the aircraft may have to divert from its flight plan in order to return to the airport to allow the ground crew to remove the locking pin from the aperture of the linkage. This flight diversion may result in a financial cost to the air carrier in the form of airport parking fees, additional fuel costs, and unexpected departure slot wait times, among others. It is therefore desirable to develop a system and a method for alerting the ground crew and the flight crew of an aircraft when the locking pin is disposed inside the aperture of the linkage of the landing gear assembly.

The presently disclosed aircraft landing gear monitoring and alerting system detects when the locking pin is disposed inside the aperture extending through the linkage of a landing gear assembly in an extended position. Upon detection of the locking pin inside the aperture, the presently disclosed aircraft gear monitoring and alerting system alerts the flight crew and the ground crew that the locking pin is disposed within the aperture extending through the linkage of the landing gear assembly, allowing the ground crew to remove the locking pin from the aperture before aircraft take-off.

In some examples of the present disclosure, the landing gear monitoring and alerting system includes a locking pin configured to be inserted into an aperture extending through at least one linkage of an extended landing gear assembly. When inserted into the aperture, the locking pin inhibits movement of the linkage to establish a locked state of the extended landing gear assembly. The aircraft landing gear monitoring and alerting system further includes a magnetic sensor disposed proximate the aperture and configured to sense a magnetic response indicative of the locking pin being disposed within the aperture to establish the locked state of the extended landing gear assembly. The magnetic sensor is configured to generate a sensor output indicative of the locking pin being disposed within the aperture. Additionally, the aircraft landing gear monitoring and alerting system includes a communication module having a transmitter. The transmitter is coupled to the magnetic sensor so as to receive the sensor output indicative of the locking pin being disposed within the aperture of the linkage. The communication module is configured to responsively transmit a signal indicative of the locking pin being disposed within the aperture, establishing the locked state of the extended landing gear assembly.

In some aspects of the present disclosure, the landing gear monitoring and alerting system may include a display device within a primary field of view in a cockpit of an aircraft. The display device is configured to display information about the locking pin being disposed within the aperture to establish the locked state of the extended landing gear assembly in response to the transmitted signal being received by the display device via a data network of the aircraft.

In aspects of the present disclosure, the magnetic sensor may include a magnetic sensor-activated switch, wherein the magnetic sensor is configured to activate the magnetic sensor-activated switch upon magnetically sensing that the locking pin is disposed within the aperture. The magnetic sensor-activated switch also provides the sensor output to the communication module.

In aspects of the present disclosure, the linkage may include a pair of pivotally coupled linkage members. The aperture of the linkage extends through the pair of pivotally coupled linkage members. The locking pin is configured to be inserted within the aperture extending through the pair of pivotally coupled linkage members to inhibit movement of the pair of pivotally coupled linkage members relative to each other, such that the pair of pivotally coupled linkage members are held in fixed relation to each other.

In some aspects of the present disclosure, the communication module may include a microcontroller configured to receive the sensor output from the magnetic sensor. The communication module may include integrated wifi components configured to wirelessly transmit the signal indicative of the locking pin being disposed within the aperture of the linkage.

In aspects of the present disclosure, the microcontroller may be a universal host controller interface that transmits the signal indicative of the locking pin being disposed within the aperture via a universal asynchronous receiver-transmitter.

In some aspects of the present disclosure, the communication module may be configured to transmit the signal indicative of the locking pin being disposed within the aperture of the linkage to a ground crew handheld device in response to receiving the sensor output indicative of the locking pin being disposed within the aperture.

In some aspects of the present disclosure, the communication module may be configured to transmit the signal indicative of the locking pin being disposed within the aperture in response to: (a) receiving the sensor output indicative of the locking pin being disposed within the aperture; and (b) receiving flight phase information indicative of a taxiing movement by an aircraft.

In aspects of the present disclosure, the landing gear monitoring and alerting system may further include a display device within a primary field of view in a cockpit of an aircraft. The display device is configured to display information about the locking pin being disposed within the aperture of the linkage to establish the locked state of the extended landing gear assembly on a synoptic page, in response to the transmitted signal being received by the display device via a data network of the aircraft.

The present disclosure also describes a method of operating a landing gear monitoring and alerting system. In some aspects of the present disclosure, the method includes monitoring a magnetic field proximate an aperture of a landing gear assembly. The landing gear assembly includes at least one linkage. The aperture extends through the linkage. The landing gear assembly includes a locking pin configured to be inserted into the aperture when the landing gear assembly is in an extended position to inhibit movement of the linkage and a establish a locked state of the landing gear assembly in the extended position. The method further includes sensing a magnetic response indicative of the locking pin being disposed within the aperture to establish the locked state of the landing gear assembly in the extended position. In addition, the method includes transmitting a signal indicative of the locking pin being inserted into the aperture, establishing the locked state of the landing gear assembly in response to sensing the magnetic response indicative of the locking pin being disposed within the aperture to establish the locked state of the landing gear assembly in the extended position.

In some aspects of the present disclosure, the method may further include displaying information about the locking pin being disposed within the aperture on a display device of an aircraft in response to the transmitted signal being received by the display device via a data network of the aircraft. The display device has a primary field of view in a cockpit of the aircraft.

In the presently disclosed method, sensing the magnetic response may include activating a magnetic sensor-activated switch upon magnetically sensing that the locking pin is disposed within the aperture and transmitting a sensor output from the magnetic sensor-activated switch to a communication module of the landing gear monitoring and alerting system in response to activating the magnetic sensor-activated switch.

In the presently disclosed method, transmitting the signal indicative of the locking pin being inserted into the aperture may include wirelessly transmitting the signal indicative of the locking pin being inserted into the aperture.

In the presently disclosed method, transmitting the signal indicative of the locking pin being inserted into the aperture may include transmitting the signal indicative of the locking pin being inserted into the aperture with a universal asynchronous receiver-transmitter.

In the presently disclosed method, transmitting the signal indicative of the locking pin being inserted into the aperture may include transmitting the signal indicative of the locking pin being disposed within the aperture to a ground crew handheld device in response to sensing the magnetic response indicative of the locking pin being disposed within the aperture to establish the locked state of the landing gear assembly in the extended position.

In the presently disclosed method, transmitting the signal indicative of the locking pin being inserted into the aperture may include transmitting the signal indicative of the locking pin being disposed within the aperture in response to sensing the magnetic response indicative of the locking pin being disposed within the aperture to establish the locked state of the landing gear assembly in the extended position and receiving flight phase information indicative of a taxiing movement by an aircraft.

The presently disclosed method may further include displaying information about the locking pin being disposed within the aperture on a synoptic page displayed by a display device in response to the transmitted signal being received by the display device via a data network of an aircraft.

The present disclosure also describes an aircraft including a fuselage and a landing gear assembly movable relative to the fuselage. The landing gear assembly has an extended position and includes at least one linkage and an aperture extending through the linkage. The landing gear assembly also includes a locking pin configured to be inserted into the aperture extending through the linkage. When inserted into the aperture, the locking pin inhibits movement of the linkage to establish a locked state of the landing gear assembly in the extended position. The aircraft further includes a landing gear monitoring and alerting system coupled to the landing gear assembly. The landing gear monitoring and alerting system includes a magnetic sensor disposed proximate the aperture and configured to sense a magnetic response indicative of the locking pin being disposed within the aperture to establish the locked state of the landing gear assembly in the extended position. The magnetic sensor is configured to generate a sensor output indicative of the locking pin being disposed within the aperture. The landing gear monitoring and alerting system further includes a communication module having a transmitter. The transmitter is coupled to the magnetic sensor so as to receive the sensor output indicative of the locking pin being disposed within the aperture. The communication module is configured to responsively transmit a signal indicative of the locking pin being disposed within the aperture, establishing the locked state of the landing gear assembly in the extended position.

In some aspects of the present disclosure, the aircraft may further include a cockpit and a display device disposed in the cockpit. The display device is within a primary field of view in the cockpit. Also, the display device is configured to display information about the locking pin being disposed within the aperture to establish the locked state of the landing gear assembly in the extended position, in response to the transmitted signal being received by the display device via a data network of the aircraft.

In some aspects of the present disclosure, the magnetic sensor of the aircraft may include a magnetic sensor-activated switch, wherein the magnetic sensor is configured to activate the magnetic-sensor activated switch upon magnetically sensing that the locking pin is disposed within the aperture. The magnetic-sensor activated switch is also configured to provide the sensor output to the communication module.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
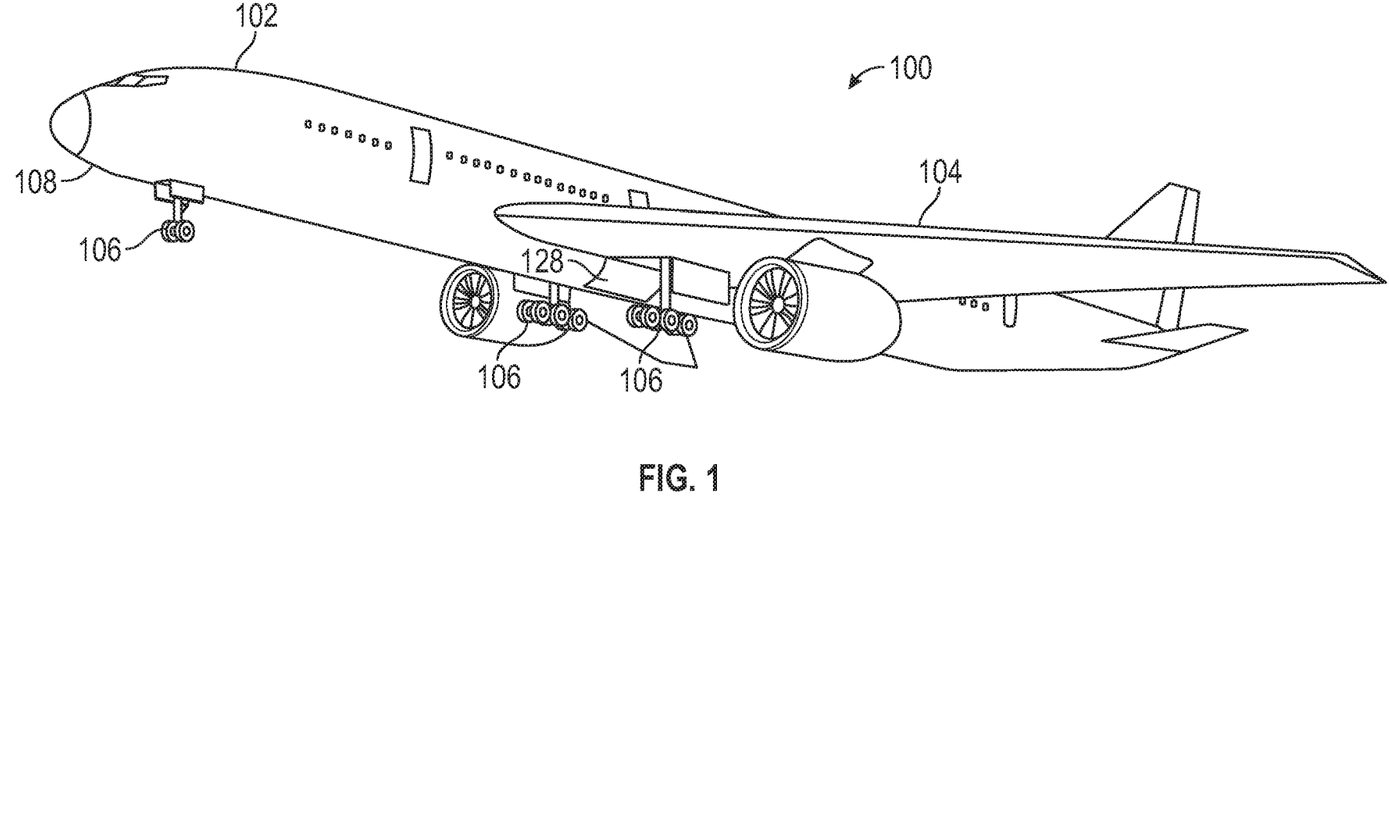
FIG. 1 is a schematic, perspective view of an aircraft including a landing gear assembly and a landing gear monitoring and alerting system.

With reference to FIG. 1, an aircraft 100 includes a fuselage 102 and two or more wings 104 coupled to the fuselage 102. In addition to the wings 104, the aircraft 100 includes one or more landing gear assemblies 106 indirectly or directly coupled to the fuselage 102. As a non-limiting example, the aircraft 100 may include two landing gear assemblies 106 each coupled under a respective wing 104 and one landing gear assembly 106 coupled to a nose 108 of the fuselage 102. Irrespective of the quantity, each landing gear assembly 106 is movably relative to the fuselage 102 between a retracted position and an extended position (as shown in FIG. 1). During landing and take-off, each landing gear assembly 106 is in the extended position to facilitate movement of the aircraft 100 on the ground. When the aircraft 100 is on the air, the landing gear assemblies 106 are in the retracted position to minimize drag.

Figure 2:
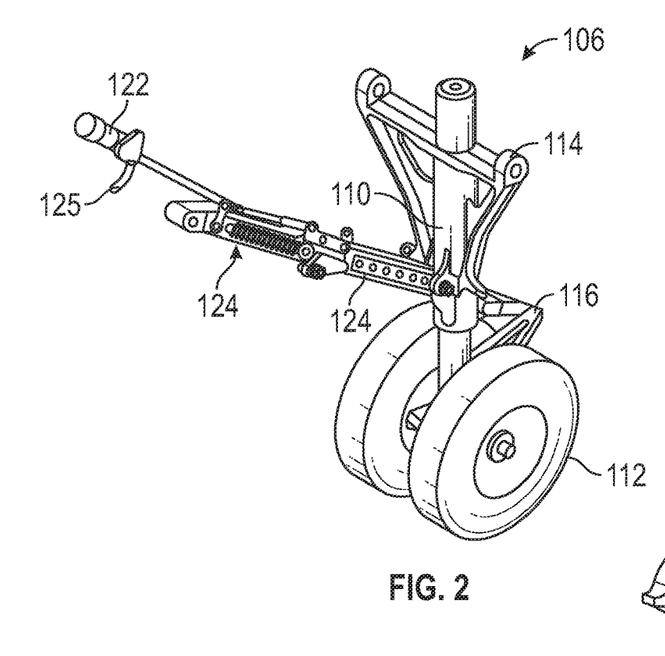
FIG. 2 is a schematic, perspective view of a landing gear assembly of the aircraft shown in FIG. 1.
Figure 3:
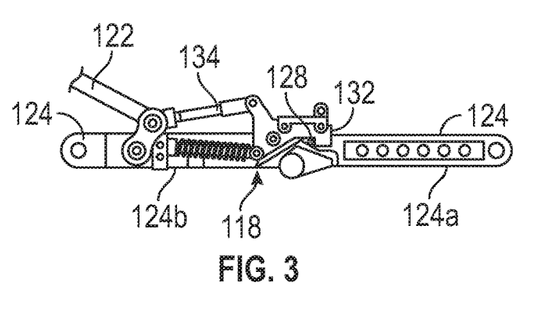
FIG. 3 is a schematic, side view of a portion of the landing gear assembly shown in FIG. 2.
Figure 4:
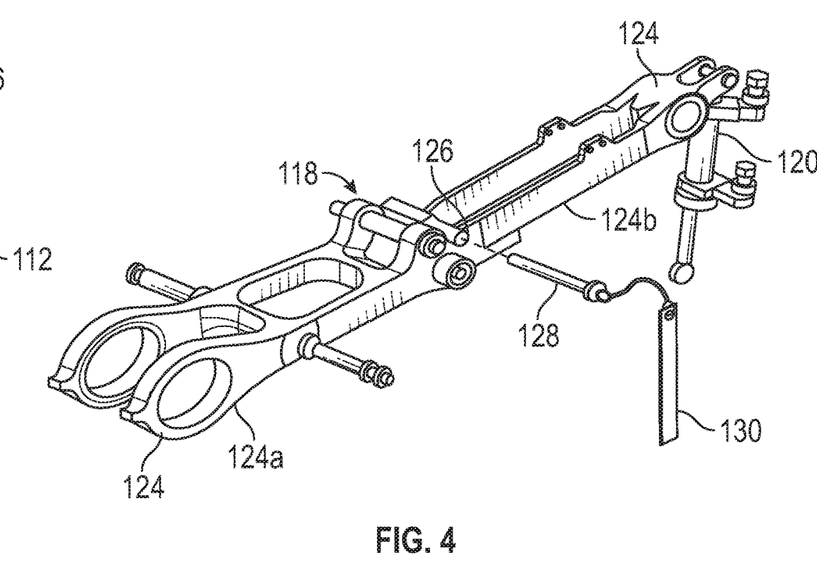
FIG. 4 is a schematic, exploded perspective view of a linkage of the landing gear assembly shown in FIG. 3, depicting a locking pin spaced apart from an aperture extending through the linkage.

With reference to FIGS. 2-4, each of the landing gear assemblies 106 includes a shock strut 110, one or more tires 112, and a shock absorber 113 coupled between the shock strut 110 and the tires 112. The shock absorber 113 is movable relative to the shock strut 110 to dampen movement on the landing gear assembly 106. In addition to the shock absorber 113, the landing gear assembly 106 may include one or more trunnions 114 coupled to the shock strut 110 to allow the landing gear assembly 106 to rotate relative to the fuselage 102 (FIG. 1). The landing gear assembly 106 further includes torque links 116 pivotally coupled to each other. The torque links 116 are connected to the shock strut 110 and the shock absorber 113 and allow linear movement of the shock absorber 113 relative to the shock strut 110 while preventing relative rotation of the shock absorber 113 and the shock strut 110.

The landing gear assembly 106 further includes at least one linkage 118 pivotally coupled to the shock strut 110. The linkage 118 facilitates movement of the landing gear assembly 106 relative to the fuselage 102 between the retracted position and the extended position. To move the linkage 118, the landing gear assembly 106 includes an actuator 120. In the depicted embodiment, the actuator 120 is a hydraulic actuator. It is envisioned, however, the actuator 120 may be another kind of actuation system capable of moving the linkage 118. The actuator 120 may include an actuating cylinder 122 and hydraulic tubing 125 in fluid communication with the actuating cylinder 122. The actuating cylinder 122 connected to the linkage 118. Upon actuation, the actuator 120 moves the linkage 118 to move the landing gear assembly 106 between the retracted position and the extended position.

The linkage 118 includes a pair of pivotally coupled linkage members 124. In the depicted embodiment, the linkage 118 includes a first linkage member 124a and a second linkage member 124b pivotally coupled to each other. The first linkage member 124a may be referred to as a lower drag brace, and the second linkage member 124b may be referred to as an upper drag brace. The landing gear assembly 106 has an aperture 126 extending through at least one linkage 118 when the landing gear assembly 106 is in the extended position. In particular, the aperture 126 extends through the pair of pivotally coupled linkage members 124. In the depicted embodiment, the aperture 126 extends through the first linkage member 124a and the second linkage member 124b. The landing gear assembly 106 includes a locking pin 128 configured, sized, and shaped to be inserted within the aperture 126 extending through the linkage 118. When inserted into the aperture 126, the locking pin 128 inhibits movement of the pair of pivotally coupled linkage members 124 to establish a locked state of the landing gear assembly 106 in the extended position. Specifically, when the locking pin 128 is inserted into the aperture 126, the pair of pivotally coupled linkage members 124 are held in a fixed relation to each other, thereby establishing the locked state of the landing gear assembly 106 in the extended position. In other words, when the locking pin 128 is inserted into the aperture 126, the first linkage member 124a and the second linkage member 124b are locked relative to each other, preventing the landing gear assembly 106 from moving from the extended position to the retracted position. As a result, the landing gear assembly 106 is locked in the extended position. The landing gear assembly 106 may further include a flag 130 attached to the locking pin 128 to remind the ground crew that the locking pin 128 should be removed from the aperture 126 before the aircraft 100 starts taxiing.

The landing gear assembly 106 may further include a locking hook 132 and a locking actuating rod 134 coupled to the locking hook 132 to lock the locking pin 128 in the aperture 126. Upon actuation by the actuator 120, for example, the locking actuating rod 134 drives the locking hook 132 toward the locking pin 128 to lock the locking pin 128 within the aperture 126.

Figure 5:
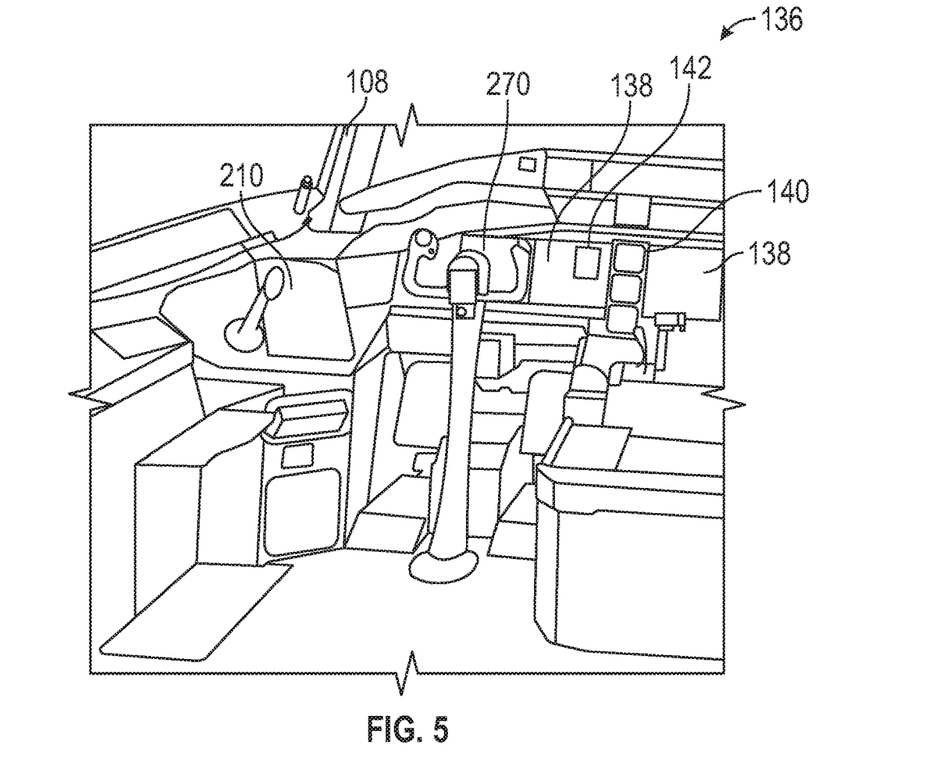
FIG. 5 is a schematic, perspective view of a cockpit of the aircraft shown in FIG. 1.

With reference to FIG. 5, the aircraft 100 further includes a cockpit 136 inside the nose 108 of the fuselage 102. The cockpit 136 includes one or more display devices 138 to visually provide information to the flight crew of the aircraft 100. The display devices 138 may be part of an instrument panel 140 of the aircraft 100, which may include analog gauges. As a non-limiting example, the display devices 138 may be liquid-crystal display (LCD) screens. Regardless of the kind of display device 138 employed, each of the display devices 138 is within a primary field of view in the cockpit 136 of the aircraft 100, thereby allowing the flight crew to view the information outputted by the display device 138. At least one of the display devices 138 is configured to display information about whether the locking pin 128 is disposed within the aperture 126 to establish the locked state of the extended landing gear assembly 106 in response to receiving a signal transmitted by a landing gear monitoring and alerting system 300 (FIG. 9) as discussed in detail below. The information about whether or not the locking pin 128 is disposed with in the aperture 126 may be outputted on a synoptic page 142 of one of the display devices 138 upon receipt of the signal transmitted by the landing gear monitoring and altering system 300. As non-limiting examples, the display devices 138 may be configured as a multi-function display (MFD), an electronic flight bag (EFB), or illuminated symbols or words on the instrument panel 140.

Figure 6:
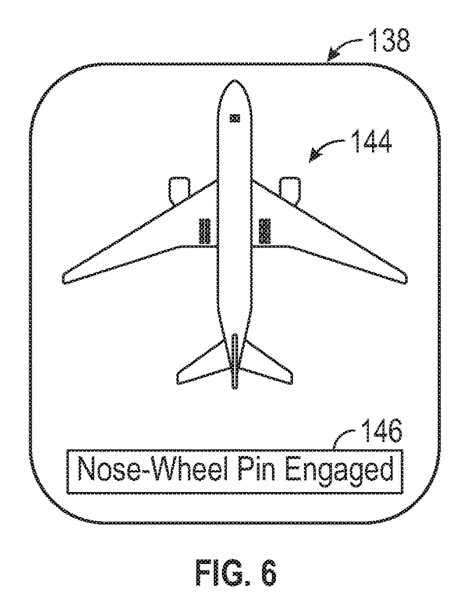
FIG. 6 is a schematic, front view of a display device of the aircraft shown in FIG. 1, depicting an image 144 of the aircraft with the landing gear assemblies.

With reference FIG. 6, the display device 138, such as an MFD or an EFB, may display an image 144 of the aircraft 100 with the landing gear assemblies 106. In response to receiving a signal from the landing gear monitoring and altering system 300, the display device 138 may, for example, change the color (e.g., from black to red) of the image 144 of the landing gear assemblies 106 that has the locking pin 128 disposed within the aperture 126 of the linkage 118. In addition, the display device 138 may display a message 146, indicating that the locking pin 128 is disposed in the aperture 126 in one or more of the landing gear assemblies 106. For example, in the depicted embodiment, the message 146 shown in the display device 138 states "NOSE-WHEEL PIN ENGAGED" to indicate that the locking pin 128 of the landing gear assembly 106 that is located in the nose 108 is disposed in the aperture 126 of that landing gear assembly 106.

Figure 7:
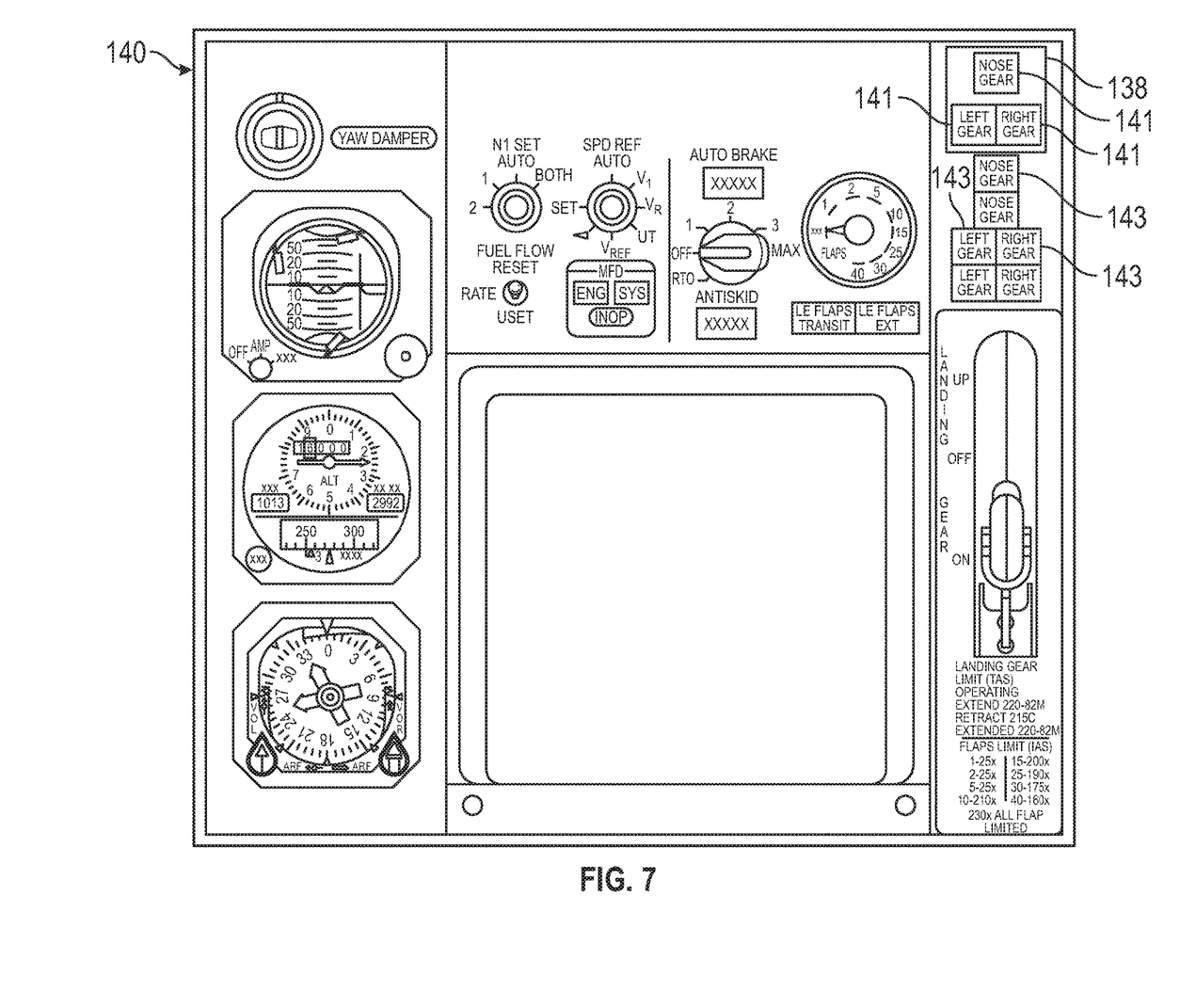
FIG. 7 is a schematic, front view of an instrument panel of the aircraft shown in FIG. 1, including landing gear lights.

With reference to FIG. 7, the display devices 138 of the instrument panel 140 are configured as illuminated words. Each display device 138 may correspond to one of the landing gear assemblies 106. For example, in the depicted embodiment, three display devices 138 include the respective messages, namely, "NOSE GEAR", "LEFT GEAR", and "RIGHT GEAR" to indicate which of the landing gear assemblies 106 has the aperture 126 inserted into the aperture 126. In this embodiment, the display devices 138 are configured as associated landing gear lights 141 and may be positioned above the landing gear down and lock lights 143. The display devices 138 may light up the message or messages corresponding to the landing gear assembly 106 that still has the aperture 126 inserted into the aperture 126 in response to receiving a signal from the landing gear monitoring and alerting system 300 (FIG. 9) as discussed in detail below.

Figure 8:
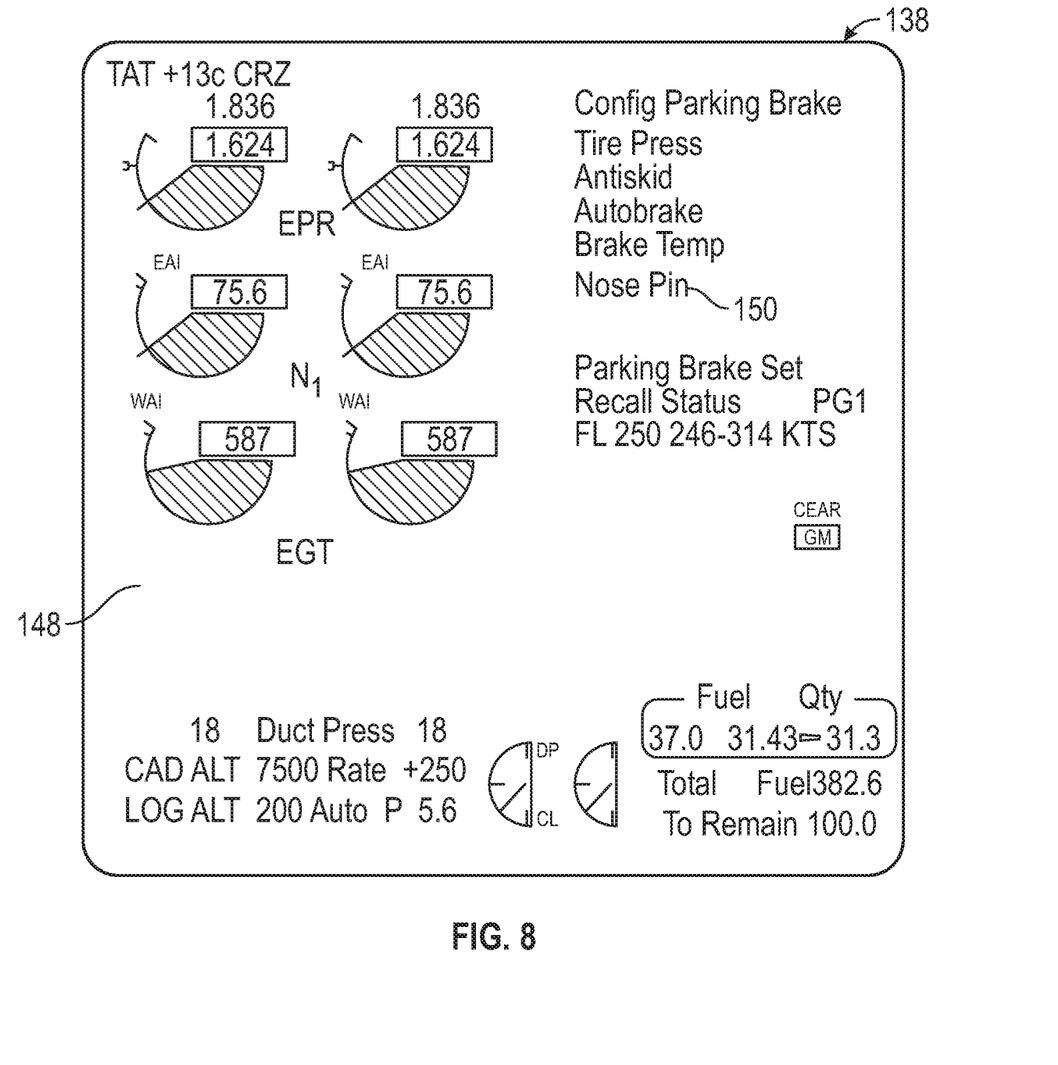
FIG. 8 is a schematic, front view of a display device of the aircraft shown in FIG. 1, including an engine-indicating and crew-alerting system (EICAS) page.

With reference to FIG. 8, the display device 138 may include an engine-indicating and crew-alerting system (EICAS) page 148. Upon receipt of the signal from the landing gear monitoring and altering system 300, the display device 138 displays information on the EICAS page 148, indicating that the locking pin 128 of one or more landing gear assemblies 106 is in the aperture 126 of the linkage 118. For example, the display device 138 may display information in the form of indicia 150, such as "NOSE PIN", to indicate that the locking pin 128 in one of the landing gear assemblies 106 is still in the aperture 126. By displaying the indicia 150, "NOSE PIN", the display device 138 indicates that the aperture 126 of the landing gear assembly 106 that is located in the nose 108 is inserted into the aperture 126 of the linkage 118.

Figure 9:
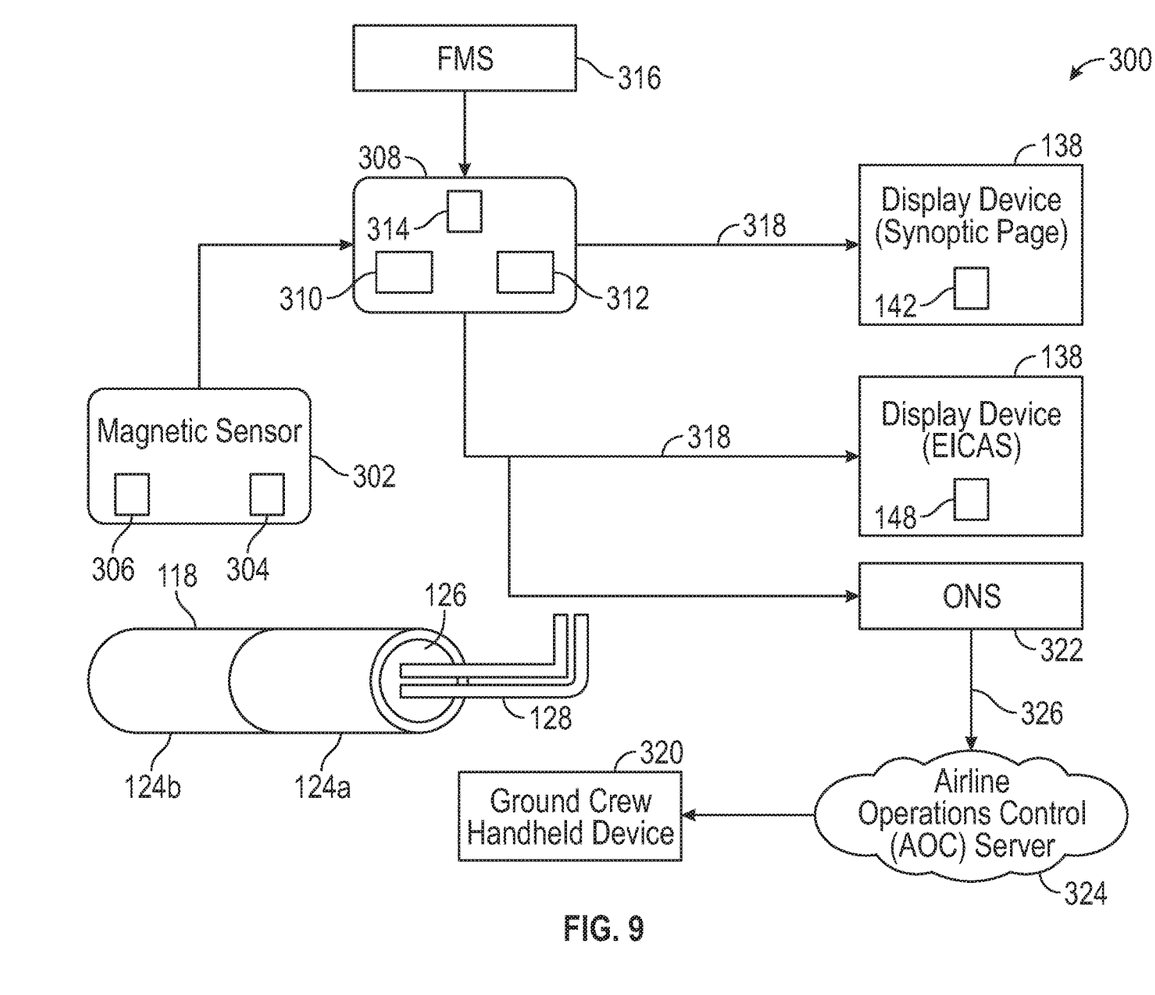
FIG. 9 is a schematic block diagram of a landing gear monitoring and altering system of the aircraft shown in FIG. 1.

With reference to FIG. 9, the landing gear monitoring and alerting system 300 monitors whether the locking pin 128 is disposed within the aperture 126 of at least one linkage 118. As discussed above, the locking pin 128 may extend through the linkage 118 (e.g., first linkage member 124a and second linkage member 124b) via the aperture 126 to establish a locked state of the extended landing gear assembly 106. This locking pin 128, which may be considered to be part of the landing gear monitoring and alerting system 300, inhibits movement of the linkage 118 when inserted into the aperture 126 to lock the landing gear assembly 106 in the extended position. Before the aircraft 100 takes off, the locking pin 128 should be removed to allow the landing gear assembly 106 to move from the extended position to the retracted position. If the locking pin 128 is not removed, the landing gear monitoring and alerting system 300 alerts the aircraft operators (e.g., flight crew and ground crew) that the locking pin 128 is disposed inside the aperture 126 of the linkage 118.

The landing gear monitoring and alerting system 300 includes a magnetic sensor 302 disposed proximate the aperture 126. As such, the magnetic sensor 302 is configured to sense a magnetic response indicative of the locking pin 128 being disposed within the aperture 126 of the linkage 118 to establish the locked state of the extended landing gear assembly 106. In other words, the magnetic sensor 302 senses disturbances as well as changes in the magnetic field proximate the aperture 126 of the linkage 118, such as strength, direction, and flux, in order to determine whether the locking pin 128 is inside the aperture 126 of the linkage 118. As a non-limiting example, the magnetic sensor 302 may be a Hall-effect magnetic sensor. To calibrate the magnetic sensor 302, testing may be conducted to sense the strength, direction, or flux of the magnetic field proximate the aperture 126 when the locking pin 128 is inserted within the aperture 126 and when the locking pin 128 is not within the aperture 126. Based on this testing, the magnetic sensor 302 determines whether the locking pin 128 is disposed within the aperture 126 of the linkage 118 in response to detecting the strength, direction, or flux of the magnetic field identified during testing when the aperture 126 is disposed within the aperture 126. In certain embodiments, the magnetic sensor 302 includes a magnetic sensor-activated switch 304. The magnetic sensor 302 is configured to activate the magnetic sensor-activated switch 304 upon magnetically sensing that the locking pin 128 is disposed within the aperture 126 of the linkage 118. In response to the activation of the magnetic sensor-activated switch 304, the magnetic sensor 302 generates and provides a sensor output. The sensor output is indicative of the locking pin 128 being disposed within the aperture 126 of the linkage 118. The magnetic sensor 302 may further include a sensor communication module 306 configured to transmit the sensor output. The sensor communication module 306 of the magnetic sensor 302 may transmit the sensor output through wires or wirelessly. In some embodiments, the sensor communication module 306 includes a transmitter configured to transmit wireless signals (e.g., a wireless sensor output). As a non-limiting example, the sensor communication module 306 may be configured as a system on chip microcontroller including a built-in antenna capable of transmitting wireless signals, such as WI-FT® and BLUETOOTH Signals®, to minimize the size and cost of the landing gear monitoring and alerting system 300.

The landing gear monitoring and alerting system 300 further includes a communication module 308 in wired or wireless communication with the magnetic sensor 302. The communication module 308 includes a transmitter 310 coupled to the magnetic sensor 302. Consequently, the communication module 308 is configured to receive the sensor output that originates from the magnetic sensor 302. As discussed above, the sensor output is indicative of the locking pin 128 being disposed within the aperture 126 of the linkage 118. The communication module 308 is configured to responsively transmit a signal indicative of the locking pin 128 being disposed within the aperture 126 of the linkage 118, thereby establishing the locked state of the extended landing gear assembly 106. In other words, due to the transmitter 310, the communication module 308 is configured to transmit a signal indicative of the locking pin 128 being disposed with the aperture 126 of the linkage 118 in response to receiving the sensor output from the magnet sensor 302, wherein the sensor output is indicative of the locking pin 128 being disposed with the aperture 126 of the linkage 118. As a non-limiting example, the communication module 308 includes a microcontroller 312 configured to receive the sensor output from the magnetic sensor 302. The communication module 308 may include integrated wifi components 314 configured to wirelessly transmit the signal indicative of the locking pin 128 being disposed within the aperture 126 of the linkage 118 in order to minimize the size of the communication module 308. For instance, the integrated wifi components 314 may include a built-in antenna integrated on the microcontroller 312, and the microcontroller 312 may be an integrated chip. The microcontroller 312 may be a universal host controller interface that transmits the signal indicative of the locking pin 128 being disposed within the aperture 126 of the linkage 118 via a universal asynchronous receiver-transmitter. The microcontroller 312 may be a universal host controller interface to minimize the power needed to operate the microcontroller 312. Further, the transmitter 310 may be a universal asynchronous receiver-transmitter to allow the magnetic sensor 302 and the communication module 308 to exchange data at their own pace.

The communication module 308 is in communication with the flight management system (FMS) 316 of the aircraft 100. As a result, the communication module 308 is configured to receive information from the FMS 316 about the flight phase of the aircraft 100. For example, the FMS 316 may transmit flight phase information to the communication module 308 indicative of a taxiing movement of the aircraft 100. In some embodiments, the communication module 308 is configured to transmit the signal indicative of the locking pin 128 is disposed within the aperture 126 of the linkage 118 in response to: (a) receiving the sensor output indicative of the locking pin 128 being disposed within the aperture 126; and (b) receiving flight phase information (from the FMS 316) indicative of a taxiing movement by the aircraft 100.

The communication module 308 is in communication with at least one display device 138 via a data network 318. The data network 318 may be a wired or wireless data network. As discussed above, the display device 138 may be within the primary field of view in the cockpit 136 of the aircraft 100 and is configured to receive the signal from the communication module 308, which is indicative of the locking pin 128 being disposed within the aperture 126 of the linkage 118 to establish the locked state of the extended landing gear assembly 106. In response to receiving this signal from the communication module 308, the display device 138 is configured to display information about the locking pin 128 being disposed within the aperture 126 to establish the locked state of the extended landing gear assembly 106. The information about whether the locking pin 128 is disposed with in the aperture 126 may be outputted on a synoptic page 142 of one of the display devices 138. Alternatively, the display device 138 may display information on the EICAS page 148, indicating that the locking pin 128 of one or more of landing gear assemblies 106 is disposed within the aperture 126 of the linkage 118. Regardless of the configuration of the display devices 138, the display devices 138 may be considered to be part of the landing gear monitoring and altering system 300.

Upon receipt of the sensor output from the magnetic sensor 302 indicating that the locking pin 128 is within the aperture 126, the communication module 308 is configured to transmit the signal indicative of the locking pin 128 being disposed within the aperture 126 of the linkage 118 to a ground crew handheld device 320. The ground crew handheld device 320 may be, for instance, a mobile phone or any other suitable device capable of displaying information to a ground crew member that the locking pin 128 is disposed within the aperture 126 of the linkage 118. Upon receiving this information on the ground crew handheld device 320, the ground crew may remove the locking pin 128 from the aperture 126 of the linkage 118. The communication module 308 may transmit the signal indicative of the locking pin 128 being disposed within the aperture 126 of the linkage 118 through an onboard networking system (ONS) 322 of the aircraft 100. The ONS 322 then transmits this signal to an airline operations control (AOC) server 324 via an airport wireless data network (e.g., airport WI-FI® network) or an aircraft communications addressing and reporting system (ACARS) 326. The AOC server 324 then transmits this signal to the ground crew handheld device 320.

Figure 10:
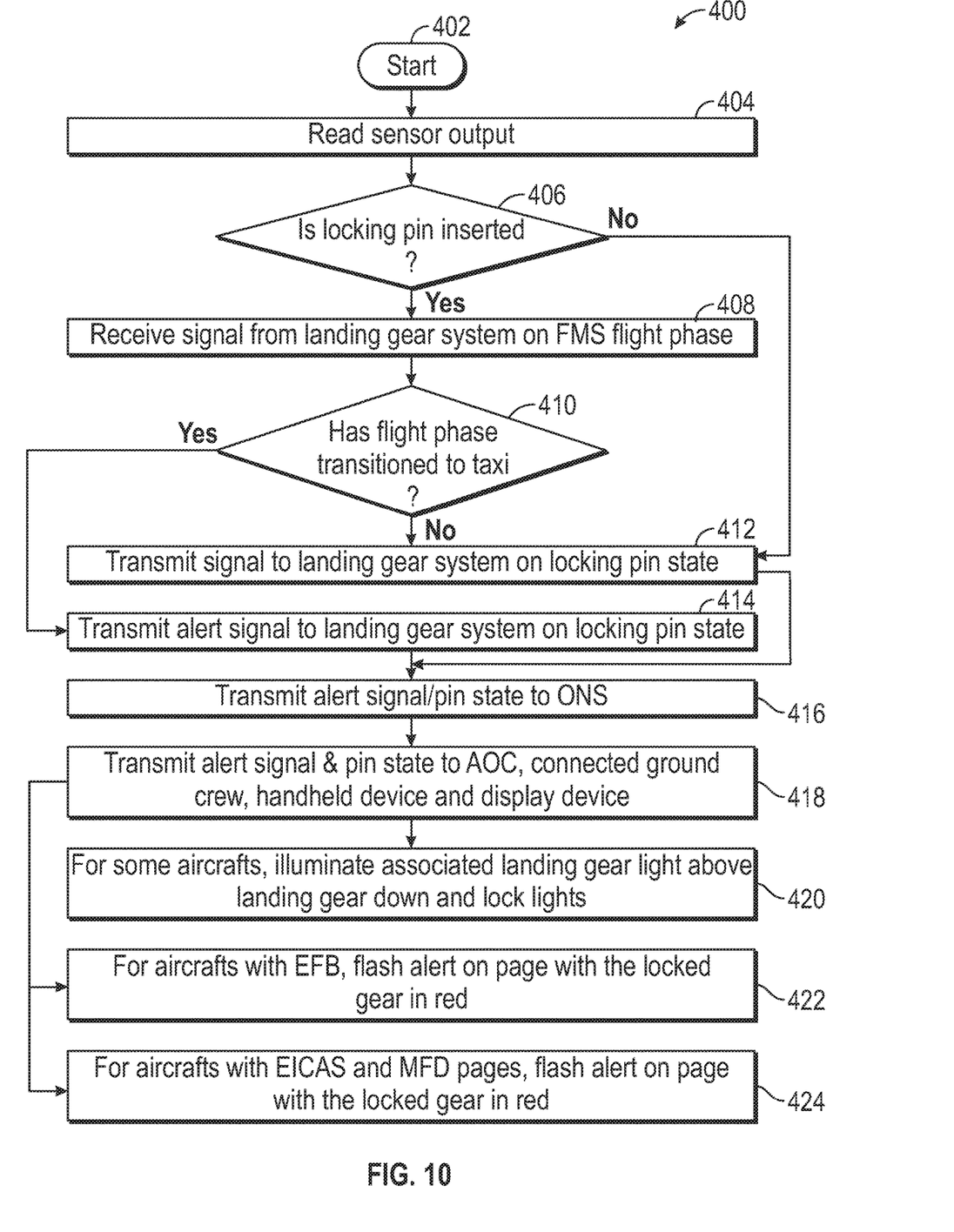
FIG. 10 is a flowchart of a method of operating the landing gear monitoring and alerting system shown in FIG. 9.

FIG. 10 is a flowchart of a method 400 of operating the landing gear monitoring and alerting system 300. The method 400 begins at block 402 (i.e., the Start block). Then, the method 400 proceeds to block 404. At block 404, the landing gear monitoring and alerting system 300 monitors a magnetic field proximate the aperture 126 of one or more landing gear assemblies 106. To do so, the microcontroller 312 reads the sensor output from the magnetic sensor 302. Next, the method 400 proceeds to block 406.

At block 406, the microcontroller 312 determines whether or not the locking pin 128 is inserted into the aperture 126 of the linkage 118 by sensing a magnetic response indicative of the locking pin 128 being disposed within the aperture 126 of the linkage 118 to establish the locked state of the landing gear assembly 106 in the extended position using the sensor output of the magnetic sensor 302. Sensing the magnetic response may entail activating a magnetic sensor-activated switch 304 upon magnetically sensing that the locking pin 128 is disposed within the aperture 126. In addition, sensing the magnetic response may entail transmitting a sensor output from the magnetic sensor-activated switch 304 to the communication module 308 of the landing gear monitoring and alerting system 300 in response to activating the magnetic sensor-activated switch 304. In response to receiving the sensor output indicative that the locking pin 128 is disposed within the aperture 126 of the linkage 118, the microcontroller 312 determines that the locking pin 128 is disposed inside the aperture 126 of the linkage 118. If the locking pin 128 is not inserted into the aperture 126, then the method 400 proceeds to block 412, where the communication module 308 transmits a signal regarding the state of the locking pin 128. In this case, this signal is indicative that the locking pin 128 is not disposed within the aperture of the linkage 118 and, consequently, no alert is activated. On the other hand, if the locking pin 128 is inserted into the aperture 126 as determined at block 406, then the method 400 continues to block 408.

At block 408, the communication module 308 receives the signal from the FMS 316 indicative of the flight phase of the aircraft 100. After block 408, the method 400 proceeds to block 410.

At block 410, the microcontroller 312 determines whether the flight phase has transitioned to taxiing based on the signal received from the FMS 316. If the flight phase of the aircraft 100 has not transitioned to taxiing, the method 400 proceeds to block 412. As discussed above, at block 412, the microcontroller 312 transmits a signal that is indicative that the locking pin 128 is not disposed within the aperture of the linkage 118. After block 412, the method 400 continues to block 416. At block 416, the signal indicative that the locking pin 128 is not disposed within the aperture 126 of the linkage 118 is transmitted to the ONS 322. If the flight phase has transitioned to taxiing as determined at block 410, then the method 400 proceeds to block 414.

At block 414, the communication module 308 transmits a signal indicative of the locking pin 128 being inserted into the aperture 126 (i.e., the alert signal) in response to: (a) sensing the magnetic response indicative of the locking pin 128 being disposed within the aperture 126 of the linkage 118 to establish the locked state of the landing gear assembly in the extended position; and (b) receiving flight phase information indicative of a taxiing movement by the aircraft 100. After block 414, the method 400 continues to block 416.

At block 416, the communication module 308 transmits the signal indicative of the locking pin 128 being inserted into the aperture 126 to the ONS 322 of the aircraft 100. Alternatively, at block 416, the signal indicative that the locking pin 128 is not inserted within the aperture 126 is transmitted to the ONS 322. The signal indicating that the locking pin 128 is not inserted within the aperture 126 may be transmitted to the ONS 322 once the locking pin 128 is removed from the aperture 126 and the locking pin 128 is securely stored in a safety locking pin case. These signals may be transmitted wirelessly. After block 416, the method 400 proceeds to block 418.

At block 418, the signal indicative of the locking pin 128 being inserted into the aperture 126 (i.e., the alert signal) or the signal indicating that the locking pin 128 is not inserted within the aperture 126 is transmitted to the display devices 138 and the ground crew handheld device 320 through the AOC server 324. The signal indicative of the locking pin 128 being inserted into the aperture 126 (i.e., the alert signal) is transmitted in response to sensing the magnetic response indicative of the locking pin 128 being disposed within the aperture 126 to establish the locked state of the landing gear assembly 106 in the extended position The method 400 then proceeds to blocks 420, 422, and 424.

At each of blocks 420, 422, and 424, the method 400 entails displaying information about the locking pin 128 being disposed within the aperture 126 on the display device 138 of the aircraft 100 in response to the transmitted signal being received by the display device via the data network 318 of the aircraft 100. As discussed above, the display device 138 has a primary field of view in the cockpit 136 of the aircraft 100. For some aircraft 100 at block 420, display information about the locking pin 128 being disposed within the aperture 126 entails illuminating associated landing gear lights 141 as shown in FIG. 7. These lights may be located above the lands gear down and lock lights 143. For aircraft 100 with EFBs at block 422, a flash alert may be displayed on the display device 138. For example, the image 144 of the relevant landing gear assembly 106 may change colors (e.g., from black to red) to indicate which of the landing gear assemblies 106 has the locking pin 128 disposed within the aperture 126 as shown in FIG. 6. In addition, the display device 138 may display a message 146, indicating that the locking pin 128 is disposed in the aperture 126 in one or more of the landing gear assemblies 106 as also shown in FIG. 6. For aircraft 100 with EICAS and MFD pages at block 424, a flash alert may be displayed on the synoptic page 142 or other suitable page on the display device 138, indicating which of the landing gear assemblies 106 is in the locked state. For example, as shown in FIG. 8, the EICAS page 148 of the display device 138 display a message in red in the form of indicia 150. The indicia 150 indicates which of the landing gear assemblies 106 is in the locked state because the locking pin 128 is disposed within the aperture 126 of the linkage 118.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the operations listed in the method 400 of FIG. 4 may be performed in a different order than illustrated, two or more of the operations may be performed concurrently (or combined), or one or more of the operations may be omitted. To illustrate, the electrical field strength data may be generated before the electrical arc is produced, such as concurrently with applying the voltage to the corona generator. Accordingly, the disclosure and the figures are to be regarded as illustrative rather than restrictive.

What is claimed is:

1. A landing gear monitoring and alerting system for an aircraft, the landing gear monitoring and alerting system comprising:
 a locking pin configured to be inserted into an aperture extending through at least one linkage of an extended landing gear assembly, which when inserted inhibits movement of the at least one linkage to establish a locked state of the extended landing gear assembly;

a locking hook and a locking actuating rod coupled to the locking hook and the at least one linkage, wherein actuation of the locking actuating rod drives movement of the locking hook to hook around the locking pin to lock the locking pin in the aperture which inhibits movement of the at least one linkage and locks the extended landing gear assembly in the locked state;

a magnetic sensor disposed proximate the aperture and configured to sense a magnetic response, prior to take-off of the aircraft, indicative of the locking pin being disposed within the aperture to establish the locked state of the extended landing gear assembly, and the magnetic sensor being configured to generate a sensor output indicative of the locking pin being disposed within the aperture; and a communication module having a transmitter being coupled to the magnetic sensor so as to receive the sensor output, prior to take-off of the aircraft, indicative of the locking pin being disposed within the aperture, and the communication module being configured to responsively transmit a signal, prior to take-off of the aircraft, indicative of the locking pin being disposed within the aperture, establishing the locked state of the extended landing gear assembly.

2. The landing gear monitoring and alerting system of claim 1, further comprising a display device within a primary field of view in a cockpit of the aircraft, the display device being configured to display information about the locking pin being disposed within the aperture to establish the locked state of the extended landing gear assembly, in response to the transmitted signal being received by the display device via a data network of the aircraft.

3. The landing gear monitoring and alerting system of claim 1, wherein the magnetic sensor comprises a magnetic sensor-activated switch, wherein the magnetic sensor is configured to activate the magnetic sensor-activated switch upon magnetically sensing that the locking pin is disposed within the aperture, and provide the sensor output to the communication module.

4. The landing gear monitoring and alerting system of claim 1, wherein the at least one linkage includes a pair of pivotally coupled linkage members, the aperture extends through the pair of pivotally coupled linkage members, and the locking pin is configured to be inserted within the aperture extending through the pair of pivotally coupled linkage members to inhibit movement of the pair of pivotally coupled linkage members relative to each other such that the pair of pivotally coupled linkage members are held in fixed relation to each other.

5. The landing gear monitoring and alerting system of claim 1, wherein the communication module comprises a microcontroller configured to receive the sensor output from the magnetic sensor, and the communication module includes integrated wifi components configured to wirelessly transmit the signal indicative of the locking pin being disposed within the aperture.

6. The landing gear monitoring and alerting system of claim 5, wherein the microcontroller is a universal host controller interface that transmits the signal indicative of the locking pin being disposed within the aperture via a universal asynchronous receiver-transmitter.

7. The landing gear monitoring and alerting system of claim 1, wherein the communication module is configured to transmit the signal, prior to take-off of the aircraft, indicative of the locking pin being disposed within the aperture to a ground crew handheld device in response to receiving the sensor output indicative of the locking pin being disposed within the aperture.

8. The landing gear monitoring and alerting system of claim 1, wherein the communication module comprises a microcontroller configured to determine whether a flight phase has transitioned to taxiing based on a signal from a flight management system, and responsive to transitioning to taxiing, the communication module is configured to transmit the signal indicative of the locking pin being disposed within the aperture in response to receiving the sensor output indicative of the locking pin being disposed within the aperture and receiving flight phase information indicative of a taxiing movement by the aircraft.

9. The landing gear monitoring and alerting system of claim 1, further comprising a display device within a primary field of view in a cockpit of the aircraft, the display device being configured to display information about the locking pin being disposed within the aperture to establish the locked state of the extended landing gear assembly on a synoptic page, in response to the transmitted signal being received by the display device via a data network of the aircraft.

10. A method of operating a landing gear monitoring and alerting system of an aircraft, the method comprising:
monitoring a magnetic field proximate an aperture of a landing gear assembly, the landing gear assembly including at least one linkage, the aperture extending through the at least one linkage, the landing gear assembly including a locking pin configured to be inserted into the aperture when the landing gear assembly is in an extended position to inhibit movement of the at least one linkage and establish a locked state of the landing gear assembly in the extended position;
actuating a locking actuating rod which drives a locking hook to hook around the locking pin to lock the locking pin in place to inhibit movement of the at least one linkage which locks the landing gear assembly is in the extended position;
sensing a magnetic response indicative of the locking pin being disposed within the aperture, prior to take-off of the aircraft, to establish the locked state of the landing gear assembly in the extended position; and
transmitting a signal, prior to take-off of the aircraft, indicative of the locking pin being inserted into the aperture, establishing the locked state of the landing gear assembly in response to sensing the magnetic response indicative of the locking pin being disposed within the aperture to establish the locked state of the landing gear assembly in the extended position.

11. The method of claim 10, further comprising displaying information about the locking pin being disposed within the aperture on a display device of the aircraft in response to the transmitted signal being received by the display device via a data network of the aircraft, and the display device having a primary field of view in a cockpit of the aircraft.

12. The method of claim 10, wherein sensing the magnetic response includes activating a magnetic sensor-activated switch upon magnetically sensing that the locking pin is disposed within the aperture and transmitting a sensor output from the magnetic sensor-activated switch to a communication module of the landing gear monitoring and alerting system in response to activating the magnetic sensor-activated switch.

13. The method of claim 10, wherein transmitting the signal indicative of the locking pin being inserted into the aperture includes wirelessly transmitting the signal indicative of the locking pin being inserted into the aperture.

14. The method of claim 10, wherein transmitting the signal indicative of the locking pin being inserted into the aperture includes transmitting the signal indicative of the locking pin being inserted into the aperture with a universal asynchronous receiver-transmitter.

15. The method of claim 10, wherein transmitting the signal indicative of the locking pin being inserted into the aperture includes transmitting the signal, prior to take-off of the aircraft, indicative of the locking pin being disposed within the aperture to a ground crew handheld device in response to sensing the magnetic response indicative of the locking pin being disposed within the aperture to establish the locked state of the landing gear assembly in the extended position.

16. The method of claim 10, wherein a communication module comprises a microcontroller configured to determine whether a flight phase has transitioned to taxiing based on a signal from a flight management system, wherein transmitting the signal indicative of the locking pin being inserted into the aperture includes responsive to transitioning to taxiing, transmitting the signal indicative of the locking pin being disposed within the aperture in response to sensing the magnetic response indicative of the locking pin being disposed within the aperture to establish the locked state of the landing gear assembly in the extended position and receiving flight phase information indicative of a taxiing movement by the aircraft.

17. The method of claim 10, further comprising displaying information about the locking pin being disposed within the aperture on a synoptic page displayed by a display device in response to the transmitted signal being received by the display device via a data network of the aircraft.

18. An aircraft comprising:
a fuselage;
a landing gear assembly movable relative to the fuselage, the landing gear assembly having an extended position, the landing gear assembly including at least one linkage and an aperture extending through the at least one linkage, the landing gear assembly including a locking pin configured to be inserted into the aperture extending through the at least one linkage, which when inserted inhibits movement of the at least one linkage to establish a locked state of the landing gear assembly in the extended position;
wherein the landing gear assembly includes a locking hook and a locking actuating rod coupled to the locking hook and the at least one linkage, wherein actuation of the locking actuating rod drives movement of the locking hook to hook around the locking pin to lock the locking pin in the aperture which inhibits movement of the at least one linkage and locks the landing gear assembly is in the extended position;
a landing gear monitoring and alerting system coupled to the landing gear assembly, the landing gear monitoring and alerting system including:
a magnetic sensor disposed proximate the aperture and configured to sense a magnetic response indicative of the locking pin being disposed within the aperture to establish the locked state of the landing gear assembly in the extended position, and the magnetic sensor being configured to generate a sensor output, prior to take-off of the aircraft, indicative of the locking pin being disposed within the aperture; and
a communication module having a transmitter being coupled to the magnetic sensor so as to receive the sensor output indicative of the locking pin being disposed within the aperture, and the communication module being configured to responsively transmit a signal, prior to take-off of the aircraft, indicative of the locking pin being disposed within the aperture, establishing the locked state of the landing gear assembly in the extended position.

19. The aircraft of claim 18, further comprising a cockpit and a display device disposed in the cockpit, the display device being within a primary field of view in the cockpit, the display device being configured to display information, prior to take-off of the aircraft, about the locking pin being disposed within the aperture to establish the locked state of the landing gear assembly in the extended position, in response to the transmitted signal being received by the display device via a data network of the aircraft.

20. The aircraft of claim 18, wherein the magnetic sensor comprises a magnetic sensor-activated switch, wherein the magnetic sensor is configured to activate the magnetic sensor-activated switch upon magnetically sensing that the locking pin is disposed within the aperture, and provide the sensor output to the communication module.

\* \* \* \* \*